(No Model.) 5 Sheets—Sheet 1.
T. H. LOVEJOY.
CASH INDICATOR AND RECORDER.

No. 560,066. Patented May 12, 1896.

Attest:
Geo. H. Arthur
H. A. Nott

Inventor
Thomas H. Lovejoy,
by Robert Burns Atty.

(No Model.) 5 Sheets—Sheet 4.
T. H. LOVEJOY.
CASH INDICATOR AND RECORDER.

No. 560,066. Patented May 12, 1896.

Attest:
Geo. H. Arthur
H. A. Nott

Inventor:
Thomas H. Lovejoy,
by Robert Burns
Att'y.

(No Model.) 5 Sheets—Sheet 5.

T. H. LOVEJOY.
CASH INDICATOR AND RECORDER.

No. 560,066. Patented May 12, 1896.

Attest:
Geo. H. Arthur
H. A. Nott

Inventor:
Thomas H. Lovejoy,
by Robert Burns
Att'y.

UNITED STATES PATENT OFFICE.

THOMAS H. LOVEJOY, OF CHICAGO, ILLINOIS, ASSIGNOR, BY MESNE ASSIGNMENTS, TO THE CHICAGO HARDWARE MANUFACTURING COMPANY, OF SAME PLACE.

CASH INDICATOR AND RECORDER.

SPECIFICATION forming part of Letters Patent No. 560,066, dated May 12, 1896.

Application filed December 16, 1895. Serial No. 572,346. (No model.)

*To all whom it may concern:*

Be it known that I, THOMAS H. LOVEJOY, a citizen of the United States, residing at Chicago, in the county of Cook and State of Illinois, have invented a certain new and useful Improvement in Cash-Registers; and I do hereby declare the following to be a full, clear, and exact description of the same, reference being had to the accompanying drawings, forming a part of this specification.

This invention relates to that class of cash-registers in which a series of indicating and printing cylinders or sectors are manipulated by hand to indicate the amount of a purchase and at the same time print the amount of such purchase upon a record-strip of paper that is arranged within the register-casing, and upon which the amount of each succeeding purchase is recorded for future reference, the object of the present improvement being to provide a simple, compact, and efficient construction and arrangement of such mechanism, and which embodies a direct connection between the series of comparatively large indicator cylinders or sectors and the corresponding and coacting series of smaller type or printing cylinders or sectors, a direct connection of such printing and indicating cylinders or sectors with their individual operating-handles, means for retarding and holding the printing and indicating cylinders or sectors at their point of adjustment, means for giving a visual indication of the amount of the purchase at both front and back of the machine, and means for adjusting the printing-platen as well as reciprocating the same, all as will hereinafter more fully appear, and be more particularly pointed out in the claims.

The aforesaid object is attained by the construction and arrangement of parts illustrated in the accompanying drawings, in which—

Figure 1:
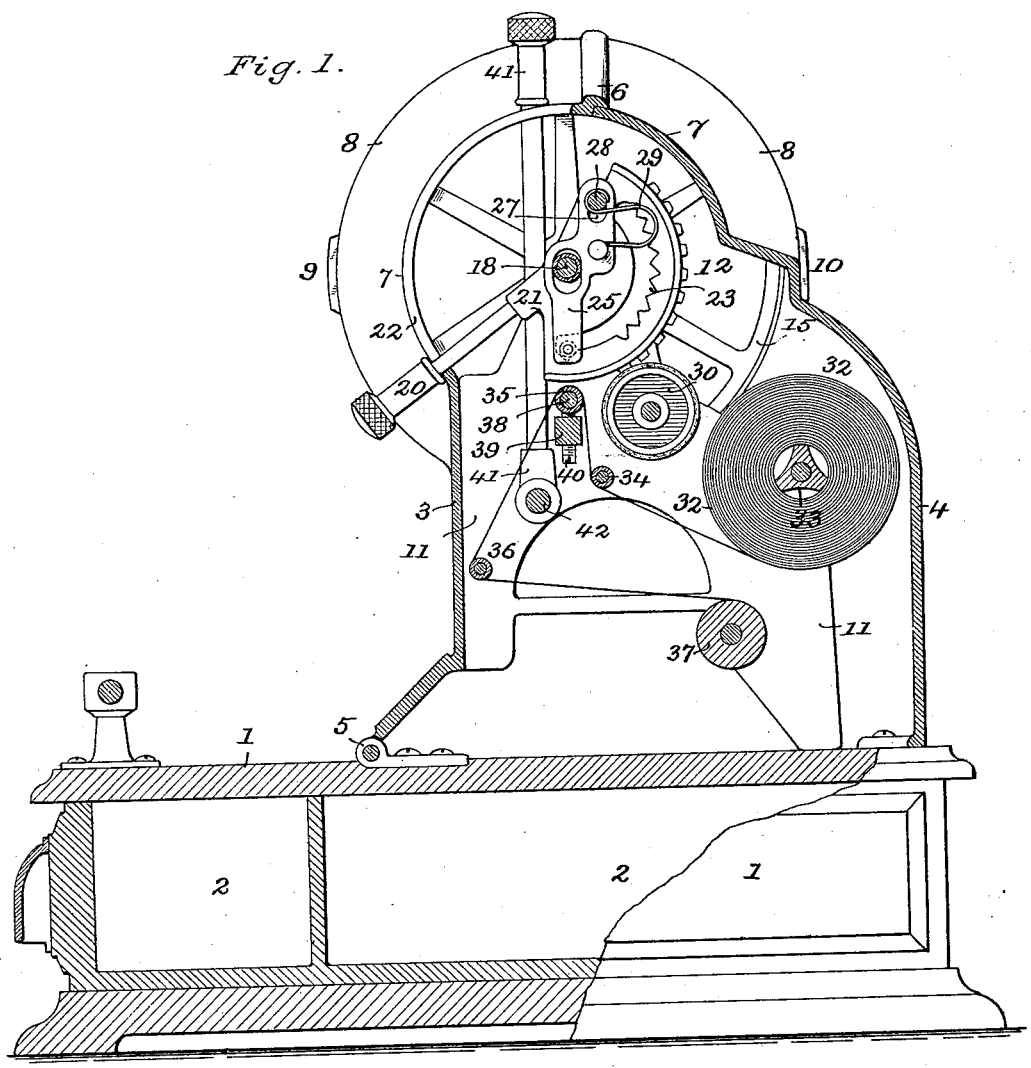
Figure 2:
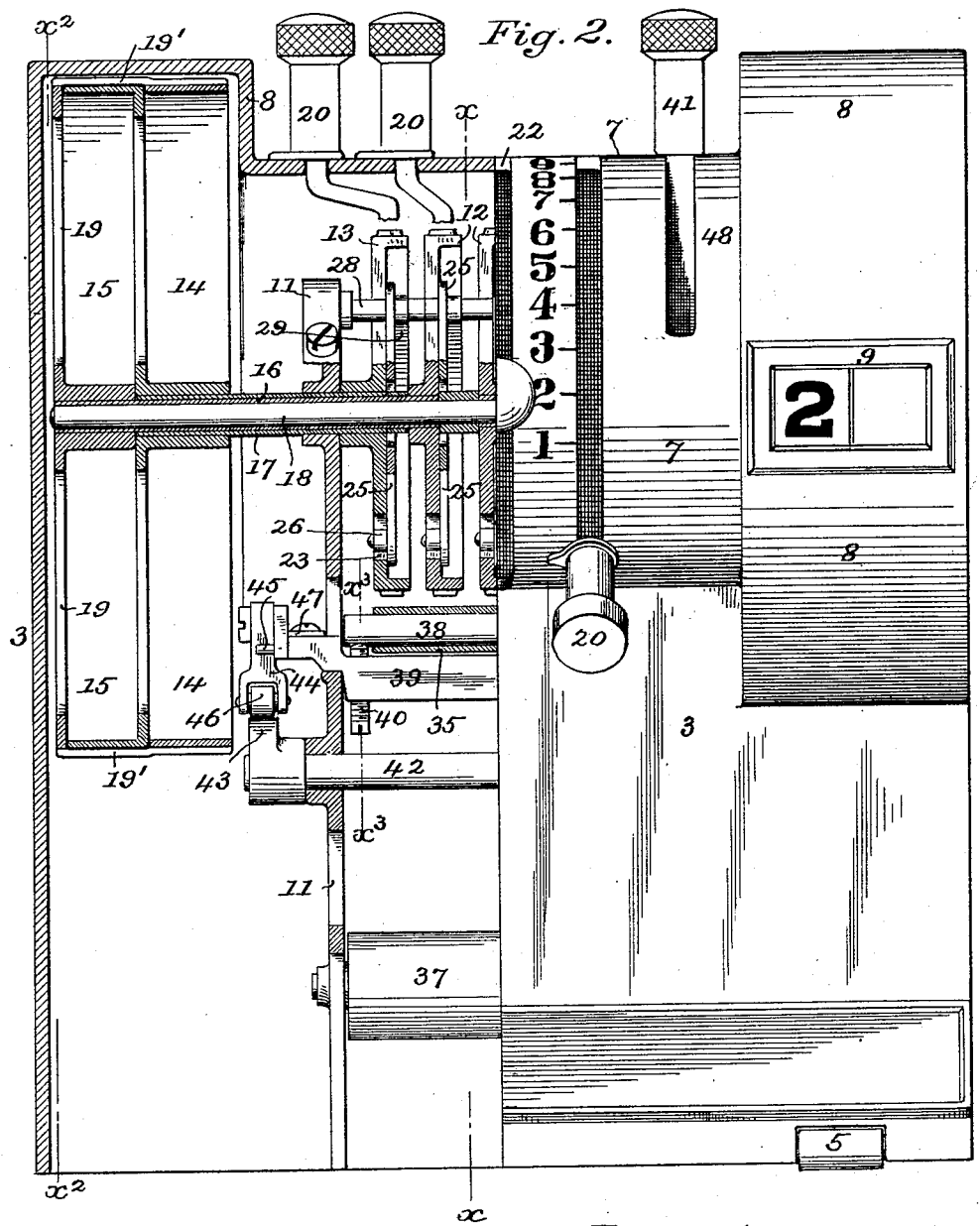
Figure 3:
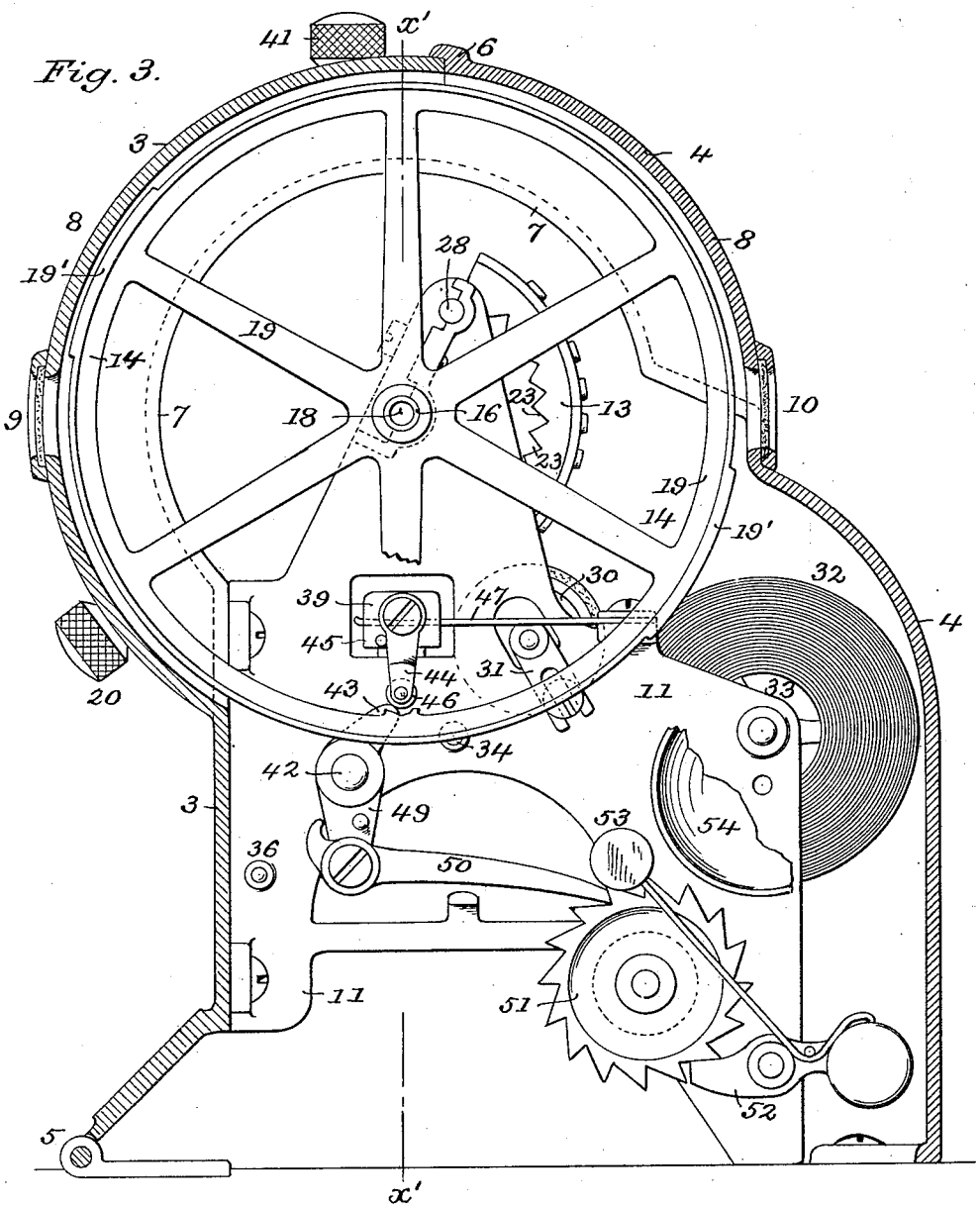
Figure 4:
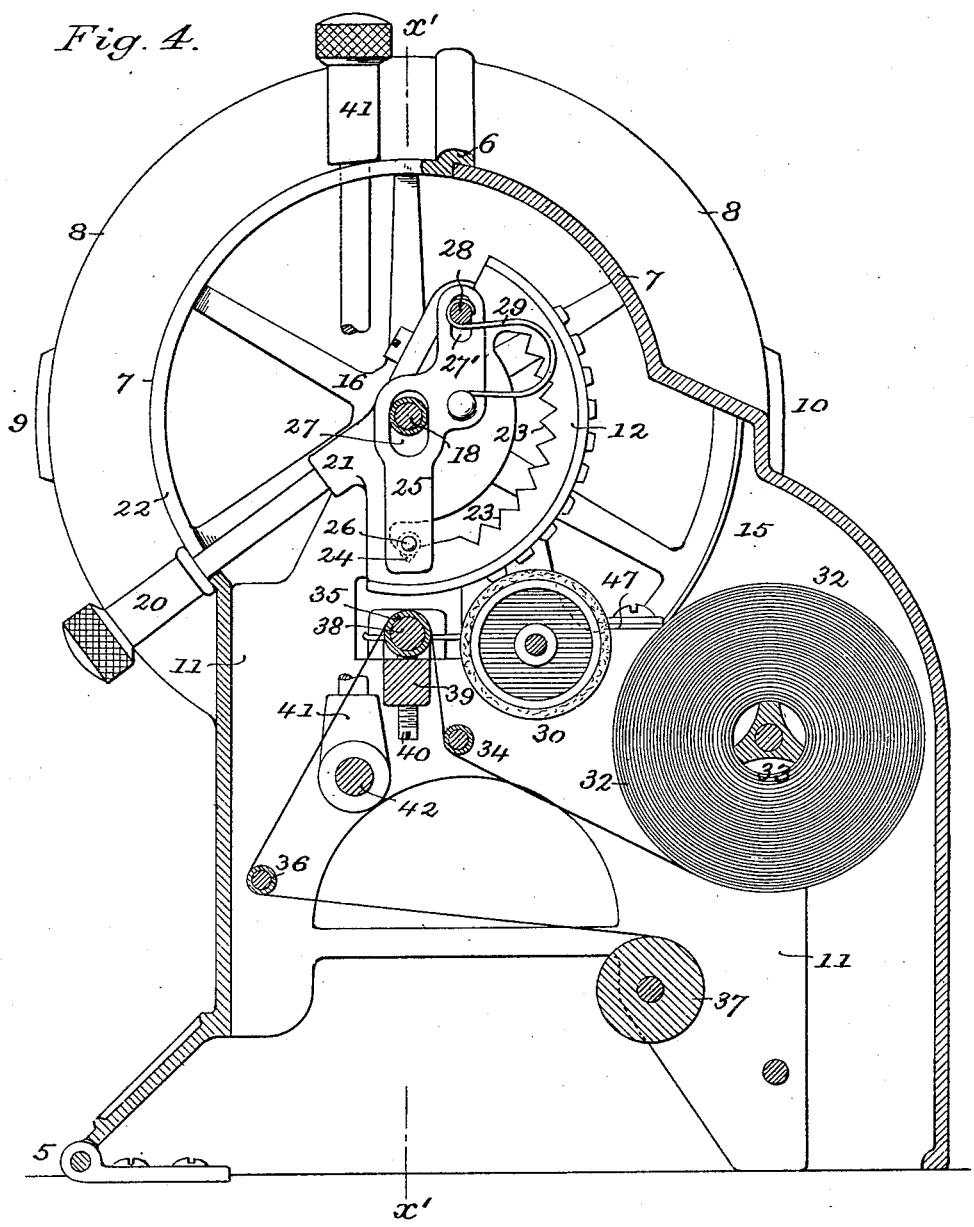
Figure 5:
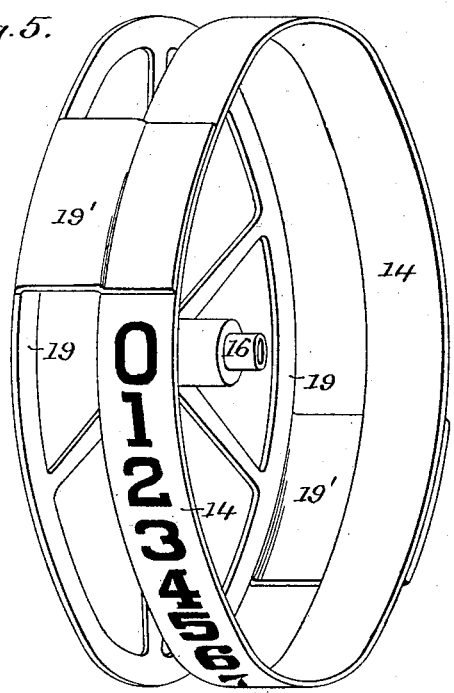
Figure 6:
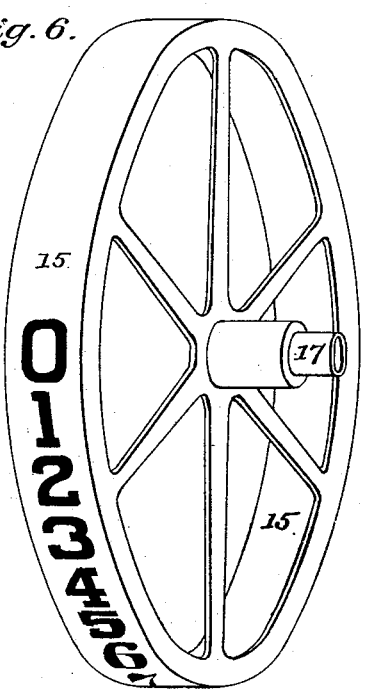
Figure 7:
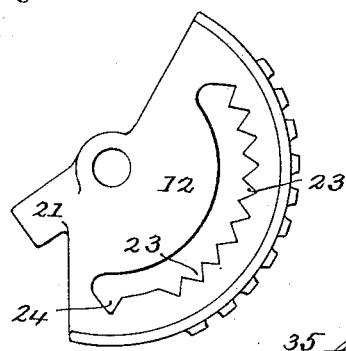
Figure 8:
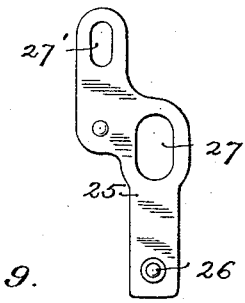
Figure 9:
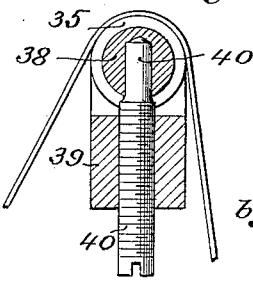

Figure 1 is a general sectional elevation at line $x\,x$, Fig. 2. Fig. 2 is a view, one-half in elevation and one-half in section, at line $x'\,x'$, Figs. 3 and 4; Fig. 3, a detail sectional elevation of the mechanism proper at line $x^2\,x^2$, Fig. 2. Fig. 4 is a similar detail sectional elevation at line $x\,x$, Fig. 2. Fig. 5 is a detached perspective view of the inner indicating-cylinder; Fig. 6, a similar view of the other indicating-cylinder; Fig. 7, a side elevation of one of the printing-sectors detached; Fig. 8, a side elevation of the spring-dog of the printing-sectors detached; Fig. 9, an enlarged detail sectional view at line $x\,x$, Fig. 2, illustrating the adjustment of the printing-platen.

Similar numerals of reference indicate like parts in the several views.

Referring to the drawings, 1 represents the usual supporting-base of the machine, in which is arranged the sliding money-drawer 2. The money-drawer will be of any usual type, preferably of a normally-locked nature that is released for the purpose of making change when the register is manipulated to indicate the amount of purchase.

The housing proper for the indicating and printing mechanism consists of a front and rear section 3 and 4, the rear section being fixedly attached to the main base 1, while the front section is hinged thereto at its lower and forward end by means of hinges 5, so as to be capable of being tipped forward to disclose the register mechanism, which will usually be secured to and carried by such front section of the housing.

6 is the joint between the two sections of the housing, which will usually be locked together by any usual means against any unauthorized interference with the mechanism of the register.

In the present improvement the housing or casing will be formed with a middle curved portion 7 at top, which is sunk between the counterpart curved portions 8 and 8 at each side thereof. As so constructed, a central sunken way or path is provided for the series of independent operating-handles by which the printing and indicating cylinders or sectors are operated, and such handles are thus protected in a very perfect manner from damage, as their free ends will project but very little outside the enlarged outer curved portions 8 8. In the construction just described the comparatively large indicator cylinders or sectors are located within the counterpart outer curved portions 8 and 8, and the smaller printing cylinders or sectors within the middle and sunken portion 7 of the main housing.

9 and 10 are the usual orifices at the front and rear sides of the curved portions 8 of the housing, through which is viewed the amount of the purchase.

11 is the supporting-frame of the register mechanism, consisting of a pair of side plates properly tied together, and which are adapted to be attached to the hinged front section 3 of the housing by means of screws passing through suitable lugs on the sides of such plates.

12 and 13 are a series of counterpart type cylinders or sectors, usually four in number and arranged in line, each one being attached to its individual tubular shaft, and the series of such shafts will be extended out laterally through the respective sides of the frame 11, and each will carry its individual indicator cylinder or sector 14 or 15. In the construction shown the tubular shafts 16 of the innermost type-printing cylinders or sectors 12 will pass through the tubular shafts 17 of the outermost printing cylinders or sectors 13, while a central steady-shaft 18 will pass through the whole to maintain the series of printing-cylinders, &c., in proper alinement. As so constructed, it will be necessary to have the indicator cylinders or sectors in the same relation as the printing-cylinders, so that the indication given will correspond with the amount printed or registered, and to this end the two indicator cylinders or sectors 14, that are secured to the shafts 16 of the two inner printing cylinders or sectors 12, so as to move in unison therewith, will have their indicating rim portion arranged at the inner side of the rim portion of the other two indicator cylinders or sectors 15, that are secured to the shafts 17 of the two outer printing cylinders or sectors 13. Such last-mentioned indicator cylinders or sectors 15 will be of a rimmed formation, with the supporting-webs attached directly to their tubular shafts 17, while the first-mentioned indicator cylinders or sectors 14 will have their web portions 19 connected to their indicating rim portions by skeleton bridge-pieces 19', so as to leave spaces between such webs and rims sufficient to receive the rim portions of the indicator cylinders or sectors 15, as illustrated in Figs. 2 and 5.

In the present invention the indicators above mentioned will have their rim portions or flanges concentric with their axes of rotation, and upon the periphery of such rim portions or flanges will be placed the indicating-figures, as shown in Figs. 5 and 6, and it is preferable to make such indicators of the circular shape shown in the drawings, in that it admits of two sets of indicating-figures being placed thereon, and which are visible through the front and rear visual openings 9 and 10, respectively. In cases where only one visual opening is required the indicators can be cut down to a sector form of the required size.

20 are a series of individual handles by which the series of type cylinders or sectors and their accompanying indicator cylinders or sectors are set to indicate any given purchase, and set the same ready for a recording or printing of such amount. The shanks or rods of these series of handles are connected at their inner ends directly to the series of printing cylinders or sectors 12 and 13 by hubs 21 thereon, and at their outer ends are provided with the knobs or handles proper by which they are manipulated.

22 are a series of slots in the curved portion 7 of the housing through which the handles 20 pass and in which they have the required movement.

23 are a series of inwardly-projecting serrations formed on the printing cylinders or sectors 12 and 13, and which are spaced to correspond with the spacing of the type-letters upon the periphery of such cylinders or sectors. Such serrations are preferably made in the web of such cylinders or sectors as shown. They may, however, be made in the inner surface of the rim of such sectors without departing from the spirit of this part of my invention.

24 is a supplementary locking-recess similar to the serrations 23, and placed forward of such serrations, so as to hold each type-cylinder normally in position with the initial one of its series of printing-type in contact with the ink-roller 30 by which such types are inked.

25 are a series of retarding dogs or pawls for the series of printing cylinders or sectors 12 and 13, having at their lower ends rollers or studs 26, adapted to engage in the serrations 23 24 to hold the printing-cylinders and their attached parts at the point of indication, &c., required, and which are adapted to ride over such serrations when sufficient force is applied by hand to effect an adjustment of such printing-cylinders, &c.

27 and 27' are elongated guide-slots in the respective pawls or dogs 25, that embrace the respective shafts of the printing-cylinders as well as the upper stationary rod 28, so that such dogs will be guided thereby in their rectilinear movement in the operation of the parts.

29 are springs of any suitable form, preferably of a loop form, as shown, that are attached to the shaft 28 and to studs on the sides of the pawls or dogs 25, as shown, so as to exert a downward pressure and tend to hold such pawls or dogs in engagement with the serrations of the printing-cylinders.

30 are the ink-rollers by which the type-face of the printing-cylinder is inked. These rollers will be provided with a porous covering or facing for holding the inking fluid and will be journaled in adjustable bearings 31 at the side of the supporting-frame, so as to be capable of the proper adjustment with relation to such printing-cylinders.

32 is the paper-roll carried by a suitable mandrel 33, that has bearing in the main frame, as shown, and from which the web of paper passes, first, under the guide-roller 34, so as to clear the ink-rollers 30, up over the cylindrical printing-platen 35, and down around a guide-roller 36 to the winding-roll 37, upon which the printed web is wound for subsequent reference.

The printing-platen 35 in the present improvement consists of a revoluble sleeve turning loosely on a supporting-core 38, that in turn is supported in an adjustable manner on a reciprocating cross-head 39 by means of adjusting-screws 40 at each end, that screw through such cross-head, with their upper ends engaged in suitable holes in the ends of the supporting-core 38, as shown in Figs. 2 and 9.

Motion is communicated to the cross-head 39 by the following means: 41 is a vertically-arranged hand-lever, the lower end of which is attached to the rock-shaft 42, that at each end carries an operating-cam 43, that in the movement of the hand-lever 41, to effect a printing operation, engages against the pivoted and pendent arm 44 on the respective ends of the cross-head 39 to impart an upward movement to such cross-head, and through the cylindrical platen 35 press the paper-web against the type-surface of the printing-cylinders to effect record of a purchase.

In the above operation the pendent arms 44 are held in a stationary position with relation to the cross-head 39 by a stop-pin or stud 45 thereon, while in a reverse movement of the operating hand-lever 41 and its cams 43 such pendent arms 44 are free to move backward with the cams without imparting any upward movement to the cross-head, and at the same time allow the cams to pass, so as to be in proper position and ready for the next printing or recording operation.

In use the lower end of the pendent arm 44 will be provided with a friction-reducing roller 46, with a view to avoid wear of parts during continued use.

The cross-head 39 is guided in its reciprocating movement by means of a pair of horizontally-arranged spring-links 47, the one ends of which are fixedly attached to lateral lugs on the main supporting-frame and the other ends to the cross-head, as shown. By the use of springs in this connection a dual purpose is attained—to wit, a guiding of the cross-head in its movement and a return of the same to its lower and normal position after the printing action has been effected.

The operating hand-lever 41 of the printing mechanism just described will extend upward and project through a slot 48 in the curved portion 7 of the inclosing housing, as shown.

The rotary platen 35 may be of the plain cylindrical type, as shown in the drawings, or may, if desired, have its surface made many sided, as usual in this class of printing devices.

49 is an arm on the rock-shaft 42, to the lower end of which is pivoted the pawl 50, that engages a ratchet-wheel 51 on the carrying-shaft of the paper-winding drum or roller 37, to impart an intermittent motion to such drum at each operation of the cash-register, and bring a fresh surface of the paper in line for the next printing or recording operation.

52 is a pivoted spring-pawl carrying the gong 53 of an alarm-bell 54, and which engages with and is operated by the ratchet-wheel 51, at each intermittent movement of the same, to sound an alarm that an indication and registration of a purchase have been made.

Having thus fully described my said invention, what I claim as new, and desire to secure by Letters Patent, is—

1. In a cash-register, the combination of the housing having a central curved and sunken portion 7, and counterpart curved and enlarged side portions 8, that form a sunken way or path for the operating-handles, the centrally-arranged printing cylinders or sectors, having directly-attached operating-handles 20, and the laterally-arranged indicating cylinders or sectors, substantially as set forth.

2. In a cash-register, the combination of the housing having counterpart curved and enlarged side portions 8, provided with visual orifices, and central curved and sunken portions 7, that form a sunken way or path for operating-handles, the centrally-arranged printing cylinders or sectors, having directly-attached operating-handles 20, and the laterally-arranged indicating cylinders or sectors, substantially as set forth.

3. In a cash-register, the combination of the housing having a central curved and sunken portion 7, and counterpart curved and enlarged side portions 8, that form a sunken way or path for the operating-handles, the centrally-arranged printing cylinders or sectors having directly-attached operating-handles 20, and the laterally-arranged indicating cylinders or sectors, the sunken portion 7, being provided with a series of slots 22, for the movement of the operating-handles 20, substantially as set forth.

4. In a cash-register, the combination of the series of printing cylinders or sectors 12, and 13, and the series of individual indicating cylinders or sectors 14 and 15, both series arranged on a common axis, and connected together by hollow shafts, the concentric indicating rim or flange of the cylinder or sector 14, being arranged in lateral and separated relation to its supporting-web, and connected thereto by bridge-pieces 19', so as to leave a space for the reception of the cylinder or sector 15, substantially as set forth.

5. In a cash-register, the combination of the series of printing cylinders or sectors 12, and 13, and the series of individual indicating cylinders or sectors 14 and 15, both series arranged on a common axis, and connected together by hollow shafts, the concentric indicating rim or flange of the cylinder or sector 14, being arranged in lateral and separated relation to its supporting-web, and connected thereto by bridge-pieces 19', and a central supporting-shaft 18, passing through the tubular shafts, and supporting the series of wheels in proper alinement, substantially as set forth.

6. In a cash-register, the combination of a printing cylinder or sector, having a series of inwardly-projecting serrations 23, and a spring holding-dog 25, adapted to engage the same, and formed with elongated guide-slots 27, 27' that embrace the shaft of the printing cylinder or sector, and a stationary rod 28 on the main frame, to guide said dog in its movement, substantially as set forth.

7. In a cash-register, the combination of a printing cylinder or sector having a series of inwardly-projecting serrations 23, a holding-dog 25 adapted to engage the same, and formed with elongated guide-slots 27, 27' that embrace the shaft of the printing cylinder or sector, and a stationary rod 28 on the main frame to guide said dog in its movement, and a loop-spring 29 engaging the rod 28 and a stud upon the side of the holding-dog, substantially as set forth.

8. In a combination with the printing cylinder or sector of a cash-register, a printing-platen, comprising a loose revoluble sleeve 35, a non-revoluble supporting-core 38, therefor, and a reciprocating cross-head 39, to which the core 38, is adjustably attached, substantially as set forth.

9. In a combination with the printing cylinder or sector of a cash-register, a printing-platen comprising a loose revoluble sleeve 35, a non-revoluble supporting-core 38, therefor, and a reciprocating cross-head 39, to which the core 38, is adjustably attached by means of end adjusting-screws 40, the points of which enter orifices in the core 38, substantially as set forth.

10. In combination with the printing cylinder or sector of a cash-register, a printing-platen having a reciprocating movement, the main frame having lateral attaching-lugs, and the pair of spring links or plates 47, fixedly attached at their ends to the lateral lugs on main frame, and at the other to the printing-platen frame, substantially as set forth.

11. In combination with the printing cylinder or sector of a cash-register, a printing-platen having a reciprocating movement, the pivoted pendent arms 44, stops 45, rock-shaft 42, cams 43, and operating-arm 41, substantially as set forth.

12. In combination with the printing cylinder or sector of a cash-register, a printing-platen having a reciprocating movement, the pivoted pendent arms 44, stops 45, rock-shaft 42, cams 43, and operating-arm 41, that is arranged vertically and projects through a curved slot 48 in the sunken curved portion 7 of the main housing, substantially as set forth.

In testimony whereof witness my hand this 5th day of December, 1895.

THOMAS H. LOVEJOY.

In presence of—
ROBERT BURNS,
GEO. H. ARTHUR.